United States Patent [19]

Szadkowska et al.

[11] 4,082,853

[45] Apr. 4, 1978

[54] METHOD FOR COAGULATING MILK PROTEINS

[75] Inventors: Maria Szadkowska, Warsaw; Jerzy Pisarek, Pruszkow; Boleslaw Dzik, Ilawa; Elzbieta Staniak, Garwolin; Danuta Lipniewska; Franciszek Bijok, both of Warsaw, all of Poland

[73] Assignee: Instytut Przemyslu Mleczarskiego, Warsaw, Poland

[21] Appl. No.: 766,560

[22] Filed: Feb. 7, 1977

Related U.S. Application Data

[63] Continuation-in-part of Ser. No. 578,897, May 19, 1975, abandoned.

[51] Int. Cl.$^2$ ............................................. A23C 19/02
[52] U.S. Cl. ........................................ 426/36; 426/39; 426/40; 426/42
[58] Field of Search ................... 426/36, 39, 40, 42, 426/55

[56] References Cited

U.S. PATENT DOCUMENTS

| 2,997,395 | 8/1961 | Berridge | 426/36 |
| 3,172,767 | 3/1965 | Foster, Jr. et al | 426/42 X |

OTHER PUBLICATIONS

Kosikowski F., Cheese and Fermented Milk Foods, Published by Auther Dept. of Food Science, Cornell University, Ithaca N.Y., 1966.

*Primary Examiner*—David M. Naff
*Attorney, Agent, or Firm*—Eric P. Schellin; Anne M. Kornbau

[57] ABSTRACT

A method for coagulating milk proteins using reduced quantities of enzymes using a two-step process is disclosed. In the first step, a quantity of proteolytic enzyme insufficient to cause coagulation is added to milk at an acidity of ° SH of 6.0 to 8.5 and the temperature is maintained at 0° C. to 32° C. for a period of from 1 to 24 hours. In the second step, a second proteolytic enzyme is added at an acidity of ° SH of 7.0 to 12.5 and the temperature is maintained at 20° C. to 45° C. for a period of from 5 to 120 minutes. Curd is obtained with an amount of enzyme from 1/15 to ½ the amount needed in a single step process.

8 Claims, No Drawings

METHOD FOR COAGULATING MILK PROTEINS

BACKGROUND OF THE INVENTION

This application is a continuation-in-part of application Ser. No. 578,897, filed May 19, 1975, and now abandoned.

The present invention relates to a two-step process for coagulating milk in the manufacture of hard, soft, and cottage cheeses using a reduced amount of proteolytic enzyme of animal, vegetable, microbial, and/or mold origin.

The know methods for coagulating milk proteins consist of a single treatment of milk with the entire quantity of enzyme necessary to effect curd formation in a specified time period.

Calf rennet has been traditionally used in cheese making, although presently many preparations have been used in cheese making which partially or completely replace the calf rennet, i.e., pepsin-rennet preparations in a 1:1 ratio based on coagulation activity. The pepsin-rennet combinations have been discussed by Martens and Naudts in FIL/IDF Publication, Annual Bulletin, Doc. No. 74, 1973. Microbial-derived preparations for coagulating milk have been discussed in the following patents: from *Mucor pusillus* Lindt in U.S. Pat. Nos. 3,151,039 and 3,212,905; from *Mucor miehei* in U.S. Pat. No. 3,549,390, in French Pat. No. 1,556,473, and Danish Pat. No. 111,031; and from *Endothia parasitica* in U.S. Pat. No. 3,275,473.

The process of curd formation in continuous cheese making methods is disclosed in the following publications: J. Ubbels and J. T. van der Linde, XVI Int. Dairy Congress C, 185, 1965; G. Hutin and P. Stenne, XVII Int. Dairy Congress D, 39, 1966; French Pat. No. 569,808; and West German Pat. No. 1,607,010. These publications disclose a two-step process of coagulating milk in 30 minutes by using 300,000 Soxhlet units of proteolytic enzyme per 100 liters of vat milk.

SUMMARY OF THE INVENTION

It has now been discovered that the amount of proteolytic enzyme needed to coagulate milk protein can be reduced by at least 66% in a two-step process wherein the temperature and acidity herein expressed as °SH of the milk are controlled during each step. Thus, hard, soft, and cottage cheeses may be manufactured using only 100,000 Soxhlet activity of proteolytic enzyme (calf rennet of its substitutes) per 100 liters of vat milk.

The method in accordance with the present invention consists of two-step addition of proteolytic enzyme of animal, vegetable, microbial, or mold origin, to milk. In the first step, proteolytic enzyme is added to milk in insufficient quantities to cause milk coagulation at an acidity of °SH of 6.0 to 8.5 at temperatures ranging from 0° C to 32° C. for from 1 to 24 hours. In the second step, a second proteolytic enzyme is added to the milk and the temperature raised to from 20° C. to 45° C. and the acidity as expressed in °SH is raised to from 7.0 °SH to about 12.5 °SH. Curd is obtained in from 5 to 120 minutes.

The coagulating activity of calf rennet and its substitutes is determined in Soxhlet units according to Milchzeitung 6,495,513,1877. The coagulating activity of pepsin is determined according to the Polish Pharmacopea IV.

The enzymatic preparations used for milk coagulation are prepared according to the manufacturer's instructions.

Additives used in the cheese manufacturing process, such as sodium chloride, saltpeter, cheese dye, etc., are added in the quantities required by the producer.

Milk derivatives that may be used in the process according to the instant invention include milk reconstituted from powdered milk, from evaporated milk, and the like.

DESCRIPTION OF THE PREFERRED EMBODIMENTS

The following examples illustrate the fundamental features of the present invention but do not limit in any way the scope of the claims.

EXAMPLE I

Manufacture of Hard Cheese, such as Edam Cheese

One hundred liters of pasteurized milk at an acidity of °SH of 6.5 to 8.0, preferably °SH 7.0, are standardized to the required fat content, e.g., 45% fat content in dry solids, 2.4% to 2.8% fat content in fluid milk, and brought to a temperature of from 29° C. to 30° C.

One hundred mg. of pork pepsin of 1:4000 coagulating activity is dissolved in 200ml. of 0.01 N hydrochloric acid 15 to 30 minutes before use.

To the milk is added about 2% starter and 20g. of anhydrous calcium chloride, and the dissolved pepsin is poured into the milk in a thin stream. The milk is agitated for ten minutes, and the temperature is maintained at 28° C. to 30° C. for an hour.

The acidity of the milk as expressed in °SH is raised to 8.0, and the milk is heated to 32° C. One gram of calf rennet, with 1:100,000 Soxhlet coagulating activity, is added, and the milk is agitated for three minutes. Milk movement is stopped, and curd sufficiently firm to cut is obtained after 30 to 40 minutes.

Further treatment of the curd is carried out in the traditional manner for making Edam cheese.

EXAMPLE II

Manufacture of Hard Cheese such as Tilsit

One hundred liters of pasteurized milk at an acidity of °SH of 6.5 to 8.0, preferably °SH 7.0, is standardized to the required fat content and brought to a temperature of from 29° C. to 30° C. From 0.5 to 1.0% of starter and 20g. of anhydrous calcium chloride are added, and an aqueous solution of 400mg. SUPAREN enzyme with coagulating activity 1:100,000 Soxhlet is poured into the milk in a thin stream. The treated milk is agitated for ten minutes, and then maintained at a temperature of from 28° C. to 30° C. The treated milk is then brought to an acidity of °SH of 8.0, heated to 32° C., and treated with one gram of FROMASE 100 rennet of coagulating activity 1:100,000 Soxhlet. This amount of FROMASE 100 is one-third of the amount normally required to coagulate 100 liters of milk.

After addition of the FROMASE 100, the milk is agitated for three minutes, after which the milk movement is stopped. Curd sufficiently firm to cut is obtained after 30 to 40 minutes.

The further procedure, i.e., treatment of curd and mass, molding, etc., is conducted in accordance with the standard method fot Tilsit cheese manufacture.

EXAMPLE III

Manufacture of Soft Cheese such as Camembert

One hundred liters of pasteurized milk at an acidity of °SH of 6.5 to 8.0, preferably °SH 7.8, is brought to a temperature of from 28° C. to 30° C. From 1.5 to 3.0% of starter for Camembert cheese, 20g. anhydrous calcium chloride, and mold culture are added to the milk.

Fifty milligrams of pork pepsin with 1:4000 coagulating activity are dissolved in 200ml. of 0.01 N hydrochloric acid 15 to 30 minutes prior to use in the process. The pepsin solution is poured in a thin stream into the milk, and the treated milk is agitated for 10 minutes. The treated milk is held at a temperature of from 28° C. to 30° C. for 1 hour, after which time the milk acidity is approximately 8.5 °SH.

The milk is heated to 32° C. and spread in cheese vats for coagulation and curd treatment. Calf rennet of coagulating activity 1:100,000 Soxhlet is added in quantities of 0.33g. to 0.66g. This represents one-third of the normally required 1 to 2 grams of calf rennet of coagulating ability Soxhlet to obtain curd after 60 to 90 minutes in 100 liters of milk. After addition of the rennet, the milk is agitated for three minutes, and milk movement is then stopped. Curd sufficiently firm to cut is obtained after 60 to 90 minutes.

Further treatment of the curd and mass is in accordance with the traditional methods of manufacture of Camembert cheese.

EXAMPLE IV

Acid-Rennet Cottage Cheese Obtained by a Centrifugal Method

One hundred liters of skimmed milk of acidity 7.5 °SH are brought to a temperature of from 25° C. to 30° C., preferably 27° C. From 0.5 to 1.2%, preferably 0.8%, of starter and 20g. of calcium chloride are added.

From 15 to 30mg., preferably 20mg., of pork pepsin of 1:4000 coagulating activity (specified according to the Polish Pharmacopea IV) are dissolved in 200ml. 0.01 N hydrochloric acid 15 to 30 minutes before use.

The pepsin is poured in a thin stream into the milk, and the milk is agitated for ten minutes. The treated milk is maintained at a temperature of from 25° C. to 30° C., preferably 27° C., for 2 hours.

The milk is then treated with 50 milligrams of calf rennet and ripening is continued for 12 to 15 hours at a temperature of from 25° C. to 30° C., preferably 27° C.

Further procedure is in accordance with the requirements for acid-rennet cottage cheese manufacture.

EXAMPLE V

Low Temperature Manufacture of Tilsit Cheese

One hundred liters of pasteurized milk of acidity 6.5 °SH to 7.5 °SH, preferably 7.0 °SH, are standardized to the desired fat content and brought to a temperature of from 0° C. to 5° C., preferably 4° C. From 0.5 to 1.0% of starter is added.

Thirty to fifty milligrams, preferably 40mg., of pork pepsin of 1:4000 coagulating activity are dissolved in 200ml. of 0.01 N hydrochloric acid 15 to 30 minutes prior to use.

The pepsin is poured into the milk in a thin stream, and the milk is agitated for ten minutes. The temperature of the treated milk is maintained at 0° C. to 5° C. for 24 hours, the milk remaining in the tank for this time.

The milk is then transferred to cheese vats, 30g. of anhydrous calcium chloride are added, and the temperature of the milk is increased to 30° C. to 34° C. The milk is treated with 0.5g. of rennet of 1:100,000 Soxhlet coagulating activity; this is one-sixth of the normally required 3g. of calf rennet of 1:100,000 Soxhlet coagulating activity used to treat 100 liters of milk.

After addition of the calf rennet, the milk is agitated or three minutes, after which time the milk agitation is stopped. Curd sufficiently firm to cut is obtained after 30 to 40 minutes.

Further treatment of the curd and mass is conducted in accordance with the requirements for Tilsit cheese manufacture.

EXAMPLE VI

Manufacture of Cheddar Cheese from Milk Stored at 10° C. to 12° C.

One hundred liters of pasteurized milk of standardized fat content is brought to a temperature of between 10° C. and 12° C., and from 0.5% to 0.8% of starter is added.

Fifty milligrams of pork pepsin of 1:4000 coagulating activity are dissolved in 200 ml. of 0.01 N hydrochloric acid 15 to 30 minutes before use.

The pepsin is poured into the milk in a thin stream, and the milk is agitated for ten minutes. The milk is maintained at a temperature of from 10° C. to 12° C. for 6 hours. At this time the milk has an acidity of °SH of from 8.2 to 8.4.

The treated milk is heated to 30° C. and 30g. of anhydrous calcium chloride and 1g. of calf rennet with coagulating activity of 1:100,000 are added. This amount of calf rennet is one-third of the normally required 3g. of calf rennet of this activity for 100 liters of milk.

The milk is agitated for three minutes and then milk movement is stopped. Curd sufficiently firm to cut is obtained after 30 minutes.

The curd is then treated in conformance with the traditional process for cheddar cheese manufacture.

EXAMPLE VII

Manufacture of Hard Cheese, such as Edam Cheese

One hundred liters of pasteurized milk at °SH adjusted to 6.5 to 8.0, preferably °SH 7.0, is standardized to the require fat content and brought to a temperature of from about 28° C. to 30° C. To the milk is added from 0.5 to 1.0% of starter and 20g. of anhydrous calcium chloride and stirred to form a solution. Then 300mg. of RENNILASE rennet enzyme with coagulating activity of 1:100,000 Soxhlet is poured into the milk in a thin stream, and the milk is agitated for ten minutes.

The treated milk is maintained at a temperature of from 28° C. to 30° C. for 1 hour. After this time the milk should reach the proper degree of acidity as measured in °SH, indicating that a suitable amount of starter had been added. The milk is then heated to 32° C.

One gram of RENNILASE, with coagulating activity of 1:100,000 Soxhlet, is added. The milk is agitated for three minutes and then allowed to rest undisturbed. Curd is obtained after 30 to 40 minutes.

Further processing of the curd is conducted according to the standard method of manufacturing Edam cheese.

EXAMPLE VIII

Manufacture of Hard Cheese, such as Tilsit Cheese

One hundred liters of pasteurized milk at °SH of 6.5 to 8.0, preferably °SH 7.0, is standardized to the required fat content and brought to a temperature of from 28° C. to 30° C. To the milk is added 0.5 to 1.0% of starter and 20g. of anhydrous calcium chloride, and stirred to dissolve the additives. Then 300mg. of calf rennet with coagulating activity of 1:100,000 Soxhlet is poured into the milk in a thin stream, and the milk is agitated for ten minutes. The rennet treated milk is held at a temperature from 28° C. to 30° C. for 1 hour, after which time the milk reaches the proper degree of acidity as measured in °SH, indicating that a suitable amount of starter had been added.

The milk is heated to 32° C. and treated with one gram of calf rennet of coagulating activity 1:100,000 Soxhlet. The milk is agitated for three minutes, and is then allowed to rest undisturbed until curd is formed, about 30 to 40 minutes.

Further treatment of the curd is conducted according to the standard method for manufacture of Tilsit cheese.

EXAMPLE IX

Manufacture of Hard Cheese, such as Gouda Cheese

One hundred liters of pasteurized milk at °SH 6.0 to 8.0, preferably °SH 7.0, is standardized to the required fat content and brought to a temperature of from 28° C. to 30° C. To the milk is added from 0.5 to 1.0% of starter and 20g. of anhydrous calcium chloride; the milk is stirred to dissolve the additives. Then 300mg. of beef pepsin with coagulating activity 1:100,000 Soxhlet is poured into the milk in a thin stream. The treated milk is agitated for ten minutes.

The beef pepsin-treated milk is held at a temperature of from 28° C. to 30° C. for 1 hour, after which time the milk reaches the proper degree of acidity, measured in °SH, indicating that the proper amount of starter had been added.

The treated milk is heated to 32° C. and one gram of EMPORASE preparation with coagulating activity 1:100,000 Soxhlet, is added. The milk is then agitated for three minutes, and left undisturbed for 30 to 40 minutes to obtain curd.

Further treatment of the curd is conducted in accordance with the standard method for Gouda cheese manufacture.

EXAMPLE X

Manufacture of Hard Cheese, such as Cheddar Cheese

One hundred liters of pasteurized milk at °SH of 6.5 to 8.0, preferably °SH 7.0, is standardized to the required fat content and brought to a temperature of from 30° C. to 31° C. To the milk is added from 0.5 to 1.0% of starter and 20g. of anhydrous calcium chloride. The milk is stirred to dissolve the additives. Then 200mg. of FROMASE rennet with coagulating activity of 1:100,000 Soxhlet is poured into the milk in a thin stream. The treated milk is agitated for 10 minutes.

The FROMASE treated milk is maintained for one hour at a temperature of from 30° C. to 31° C., after which time the milk should reach the proper degree of acidity, measured in °SH, indicating that a suitable amount of starter had been added. Then one gram of MEITO rennet, with coagulating activity 1:100,000 Soxhlet, is added.

After addition of MEITO, the milk is agitated for three minutes, then allowed to rest undisturbed. Curd is obtained after 30 to 40 minutes.

Further treatment of the curd is conducted according to the standard procedure for manufacture of cheddar cheese.

What is claimed is:

1. A method for coagulating milk proteins to produce curd comprising adding calcium, a quantity of proteolytic-coagulating enzyme in insufficient quantity to cause milk coagulation to milk plus a starter culture to milk at an acidity of °SH 6.0 to 8.5 at a first temperature ranging from about 0° C. to about 32° C., maintaining the milk at said first temperature for from 1 to 24 hours, then raising the temperature of the milk to a second, higher, temperature ranging from about 20° C. to about 45° C., and adding another proteolytic-coagulating enzyme to the milk at said second temperature range and at a second, higher, acidity of from about 7.0 °SH to about 12.5 °SH, and maintaining the milk at said second temperature range for about 5 to 120 minutes until curd is formed.

2. The method of claim 1, wherein the first proteolytic enzyme is pork pepsin.

3. The method of claim 2, wherein the second proteolytic enzyme is calf rennet.

4. The method of claim 3, wherein the first temperature is from about 28° C. to about 30° C. and the second temperature is about 32° C.

5. The method of claim 3, wherein the first temperature is from about 0° C. to about 5° C. and the second temperature is from about 30° C. to about 34° C.

6. The method of claim 1, wherein the first temperature is from about 10° C. to about 12° C. and the second temperature is about 30° C.

7. The method of claim 3 wherein the pork pepsin is present in an amount from about 20mg. to about 100mg. of pork pepsin of 1:4000 coagulating activity per 100 liters of milk.

8. The method of claim 7, wherein the calf rennet is present in the amount of from about 0.33mg. to about 50mg. of calf rennet of 1:100,000 Soxhlet coagulating activity per 100 liters of milk.

* * * * *